United States Patent
Lupien et al.

(10) Patent No.: US 7,136,395 B2
(45) Date of Patent: Nov. 14, 2006

(54) METHOD AND SYSTEM FOR TRANSMISSION OF HEADERLESS DATA PACKETS OVER A WIRELESS LINK

(75) Inventors: Francis Lupien, Montreal (CA); Mohammed Sammour, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 995 days.

(21) Appl. No.: 09/982,566

(22) Filed: Oct. 17, 2001

(65) Prior Publication Data

US 2002/0097701 A1    Jul. 25, 2002

Related U.S. Application Data

(60) Provisional application No. 60/250,253, filed on Nov. 30, 2000.

(51) Int. Cl.
| | |
|---|---|
| H04L 12/56 | (2006.01) |
| H04J 3/24 | (2006.01) |
| H04J 3/16 | (2006.01) |
| H04B 7/216 | (2006.01) |
| H04J 1/02 | (2006.01) |

(52) U.S. Cl. ............ 370/472; 370/349; 370/389; 370/392; 370/395.52; 370/395.61; 370/395.62; 370/441; 370/474; 370/493; 370/495

(58) Field of Classification Search ........ 370/349, 370/389, 474, 392, 472, 395.52, 441, 493, 370/495, 395.61

See application file for complete search history.

(56) References Cited

U.S. PATENT DOCUMENTS

| | | | | |
|---|---|---|---|---|
| 5,987,022 A | | 11/1999 | Geiger et al. ............. 370/349 |
| 6,680,955 B1 * | | 1/2004 | Le ........................... 370/477 |
| 6,882,637 B1 * | | 4/2005 | Le et al. ................... 370/349 |
| 2004/0095939 A1 * | | 5/2004 | Yang ...................... 370/395.52 |
| 2004/0264433 A1 * | | 12/2004 | Melpignano ............. 370/349 |
| 2005/0018666 A1 * | | 1/2005 | Davila et al. ............ 370/389 |
| 2005/0259690 A1 * | | 11/2005 | Garudadri et al. ....... 370/477 |
| 2005/0286523 A1 * | | 12/2005 | Liao et al. ............... 370/389 |

FOREIGN PATENT DOCUMENTS

| | | |
|---|---|---|
| EP | 1 056 259 | 11/2000 |
| WO | WO 02/30071 | 4/2002 |

OTHER PUBLICATIONS

Tom Hiller et al., Good Enough Header Compression (GEHCO), Internet Draft, Aug. 200, pp. 1-15, CP-002231145.*
Burmeister, Carsten et al. "Robust Header Compression (ROHC)". Network Working Group. Oct. 23, 2000. pp. 1-148.

(Continued)

*Primary Examiner*—Ricky Q. Ngo
*Assistant Examiner*—Feben Micael Haile
(74) *Attorney, Agent, or Firm*—Jenkens & Gilchrist, P.C.

(57) ABSTRACT

Headerless (i.e., zero byte) data packets are sent by a compressor over a radio bearer. The radio bearer includes a synchronized wireless link. A sequential timer-based value is associated with each of the headerless data packets. A decompressor generates a header based on the sequential timer-based value associated with a given received headerless data packet. A data packet having a compressed header is sent periodically over the synchronized wireless link. The data packet having the compressed header can also be sent when the compressor detects changes in slowly-varying header fields, in response to feedback received from the decompressor indicating that a decompression context is out of synchronization and/or just before talk spurts occur.

34 Claims, 2 Drawing Sheets

OTHER PUBLICATIONS

Hiller, Tom et al. "GEHCO Clarification". 3GPP2 TSG-P Wireless Packet Data Networking. Sep. 18, 2000. pp. 1-7.

Hiller, Tom et al. "Good Enough Header Compression". 3GPP2 TSG-P Wireless Packet Data Networking. Jun. 8, 2000. pp. 1-10.

Jonsson, Lars-Eric et al. "New Draft: A Link Layer Assisted ROHC Profile for IP/UDP/RTP". Network Working Group. Feb. 23, 2001. Http://www.kk.etx.ericsson.se/~dsiprod/mail_archives/eriietf/msg01185.html. pp. 1-14.

Jonsson, Lars-Eric et al. "Short ROHC Summary". Report from ROHC WG session at 49$^{th}$ IETF. Dec. 2000. Http://www.kk.etx.ericsson.se/~dsiprod/mail_archives/eriieft/msg01115.html. pp. 1-5.

Mikael Degermark et al., *CRTP over cellular radio links*, Internet draft, Network Working Group, Dec. 10, 1999.

Lars-Erik Jonsson et al., *Robust Checksum-based header Compression (ROCCO)*, Internet draft, Networking Group, Mar. 10, 2000.

Tom Hiller et al., Good Enough Header Compression (GEHCO), Internet draft, Aug. 2000, pp. 1-15, XP-002231145.

Nokia, Negotiation of Header Adaptation Functions, 3GPP TSG Geran ADHOC #2, Oct. 9, 2000, XP-002214219.

International Search Report of Jun. 2, 2003, received in corresponding application PCT/CA01/01631.

* cited by examiner

METHOD AND SYSTEM FOR TRANSMISSION OF HEADERLESS DATA PACKETS OVER A WIRELESS LINK

RELATED APPLICATIONS

This patent application claims the benefit of priority from and incorporates by reference the entire disclosure of co-pending U.S. Provisional Patent Application No. 60/250,253, filed on Nov. 30, 2000.

BACKGROUND

In recent years, two communication technologies in particular have become commonly used by the general public: (1) mobile telephones; and (2) the Internet. Mobile telephones have provided users with the potential to always be reachable with reasonable service quality no matter where they are located. However, until recently, the primary service provided by mobile telephones has been speech. In contrast, the Internet has primarily provided data services. While flexibility for different services has been one of the Internet's strengths, the quality of services, such as, for example, Internet Telephony, has generally been unacceptable.

However, Internet Protocol (IP) Telephony has been gaining momentum thanks to recent technological advances. It is reasonable to predict that in the future, IP will become a commonly-used method of carrying telephony. Mobile telephony links could be based on IP telephony. In addition, mobile stations may also support not only audio and video, but also web browsing, e-mail, and gaming, for example. When IP telephony is employed, it is obvious that a fixed network at which wireless links terminate can be IP-based.

IP could be terminated at the interface between the fixed network and wireless links connected thereto; however, this would require special solutions to be implemented for each service supported over the wireless links. The flexibility of the services supported by the wireless links would therefore be limited. Thus, a solution implementing IP all the way from mobile station to mobile station over wireless links would have certain advantages.

Spectral efficiency is one of the main problems that must be overcome in order to implement IP from mobile station to mobile station over wireless links. It is of vital importance to use the scarce radio resources in a wireless network as efficiently as possible. One of the problems with use of IP over wireless links in the context of interactive voice conversations is large header overhead.

Speech data for IP telephony is most likely carried by the Real-time Transport Protocol (RTP). In RTP, a packet has, in addition to link layer framing, an IP version 4 header of 20 octets (i.e., 160 bits), a Universal Datagram Protocol (UDP) header of 8 octets, and an RTP header of 12 octets, resulting in a total header overhead of 40 octets. With IP version 6, the IP header is 40 octets, resulting in a total of 60 octets of total header overhead. The size of the payload depends upon speech coding and frame sizes used and may be as little as 15–20 octets.

The need to reduce header sizes for spectral-efficiency reasons is therefore apparent. Header compression is essential for providing spectrally-efficient voice over IP (VoIP) and multi-media services. Existing header compression schemes do not perform well over wireless links, primarily because of high error rates and long link round-trip times. Existing compression schemes include Compression RTP (CRTP), IP Header Compression (IPHC), and Point-to-Point Protocol Header Compression (PPPHC).

In an effort to develop an improved header compression scheme, the Internet Engineering Task Force (IETF) created the RObust Header Compression (ROHC) working group. ROHC provides a header compression framework that includes improved robustness, transparency, and spectral efficiency for wireless networks. A non-transparent solution, referred to as Good Enough Header COmpression (GEHCO), has also been proposed. GEHCO is intended to compress VoIP by removing all headers; however, GEHCO is unsuited for applications other than VoIP, such as, for example, multi-media and some related VoIP applications. Therefore, a general header compression framework, such as, for example, ROHC, that can accommodate a wide variety of applications that will exist in third generation wireless networks in a consistent yet customized fashion and under a unified framework is needed.

However, in order to provide needed highly-spectrally-efficient VoIP services on existing wireless network radio bearers, ROHC needs to be extended with a scheme that provides further compression beyond that which is currently possible via ROHC. It would be desirable to increase the compression possible under ROHC to the point that VoIP and other IP-based services could be implemented over wireless links with the same efficiency as voice services are currently implemented over the wireless links in a circuit-switched mode.

Referring now to the FIGURES, FIG. 3 is a block diagram that illustrates transmission of VoIP data packets in cdma2000. A system 300 includes a mobile station (MS) 302, a radio network (RN) 304, and a packet data service node (PDSN) 306. An arrow 308 representing a transmission path of data packets from the PDSN 306 to the MS 302 is also shown. Although not explicitly shown, it will be understood by those skilled in the art that a transmission path from the MS 302 to the PDSN 306 operates in a similar fashion to that described herein.

IP/UDP/RTP data packets 310 are shown in FIG. 3 entering the PDSN 306 at a network layer via the internet protocol (IP). As shown by the arrow 308, the data packets 310 pass through the link layer (e.g., PPP) and a radio-network-point-to-point protocol (R-P) interface before being transmitted over the RN 304. While in the RN 304, the data packets 310 pass through a Radio Link Protocol/Media Access Control (RLP/MAC) layer. From the RLP/MAC layer, the data packets 310 are received by the MS 302. At the MS 302, the data packets 310 pass through the RLP/MAC layer, the link layer (e.g., PPP), and the network layer (via IP), before emerging as UDP/RTP packets.

In cdma2000, all data traffic, including VoIP data packets, uses the point to point protocol (PPP) as the link layer. In cdma2000, there is a strong need to support VoIP and header compression on currently-existing radio bearers, rather than devising or optimizing new radio bearers for purposes of VoIP. One of the limitations imposed by many existing cdma2000 radio bearers is the capacity of the radio bearers to carry a compressed or uncompressed header.

There is accordingly a need for a method and system that permit compressed-header data packets to be sent over wireless links for applications such as, for example, VoIP, and that solve the above-mentioned and other problems associated with the prior art.

SUMMARY

A method of transmitting data packets over a synchronous wireless link includes sending a headerless data packet on the synchronous wireless link. A sequential timer-based value is associated with the headerless data packet. The headerless data packet is received from the synchronous wireless link. The header of the headerless data packet is decompressed based at least in part on the sequential timer-based value associated with the received headerless data packet. The steps of sending the headerless data packet, receiving, and decompressing are repeated at least once. A data packet having a header is sent on the synchronous wireless link.

A system for sending and receiving data packets includes a first node, a second node, and a synchronous wireless link. The first node is adapted to send a headerless data packet toward the second node via a synchronous wireless link. A sequential timer-based value is associated with the headerless data packet. The first node is also adapted to send a data packet having a header on the synchronous wireless link. The second node is adapted to receive the headerless data packet via the synchronous wireless link and decompress, based at least in part on the sequential timer-based value associated with the received headerless data packet, a header of the received headerless data packet. the second node is also adapted to receive the data packet having the header. The synchronous wireless link is between the first node and the second node.

A node in a wireless communication system includes a transmitter adapted to send a first headerless data packet via a synchronous wireless link. A sequential timer-based value is associated with the headerless data packet. The transmitter is also adapted to send a first data packet having a header on the synchronous wireless link. The node also includes a receiver adapted to receive a second headerless data packet via the synchronous wireless link and receive a second data packet having a header. The node also includes a decompressor adapted to decompress, based at least in part on the sequential timer-based value associated with the first headerless data packet, the header of the first headerless data packet.

A method of transmitting a header update includes checking a packet payload size and determining whether the packet payload size permits transmission of a header with the packet. In response to a determination that the packet payload size permits transmission of a header with the packet, a header with the packet is transmitted. In response to a determination that the packet payload size does not permit transmission of a header with the packet, a headerless data packet is transmitted.

A method of transmitting a header update includes delaying a sequence of data packets and determining whether the delayed sequence of data packets comprises a talk spurt. In response to a determination that the delayed sequence comprises a talk spurt, a header update is transmitted prior to transmission of the delayed sequence of data packets.

A method of transmitting a header update includes transmitting a sequence of data packets and determining whether at least one property of the transmitted sequence of data packets predicts a talk spurt. In response to a determination that the at least one property of the transmitted sequence predicts a talk spurt, a header update is transmitted prior to transmission of a first data packet of the predicted talk spurt.

BRIEF DESCRIPTION OF THE DRAWINGS

A more complete understanding of the present invention can be had by reference to the following Description when taken in conjunction with the accompanying Drawings, wherein.

DETAILED DESCRIPTION Of THE DRAWINGS

Figure 1A:
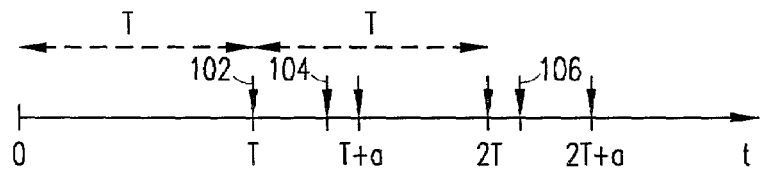
FIG. 1(a) is a diagram that illustrates a first exemplary periodic update scheme in accordance with principles of the present invention.

In the following Detailed Description of the Drawings, for purposes of explanation and not limitation, specific details are set forth in order to provide a thorough understanding of embodiments of the present invention. However, it will be apparent to those of ordinary skill in the art that the present invention can be practiced in other embodiments that depart from these specific details. In other instances, detailed descriptions of well-known methods, devices, etc. are omitted so as not to obscure the description of the present invention with unnecessary detail. Preferred embodiments of the present invention and its advantages are best understood by referring to FIGS. 1–5 of the Drawings, like numerals being used for like and corresponding parts of the various Drawings.

Aspects of cdma2000 will be used to describe preferred embodiments of the present invention. However, it should be understood that the principles of the present invention are applicable to other wireless communication systems, especially those in which a slotted synchronous channel is used.

In order to provide highly spectrally-efficient multi-media services, such as, for example, Voice over IP (VoIP), on existing wireless radio bearers, embodiments of the present invention extend RObust Header Compression (ROHC) with a scheme that provides headerless (i.e., zero byte) header compression. A ROHC-compatible zero byte profile is used in accordance with preferred embodiments of the present invention. The zero byte profile permits headerless data packets to be transmitted over wireless links during a majority of the time that data packets are being transmitted over the wireless links. Underlying link and physical layers are relied upon to regenerate some of the fields of the header. Unlike Good Enough Header Compression (GEHCO), the zero byte profile used in accordance with embodiments of the present invention comprises additional mechanisms that ensure transparency, robustness, and reliable operation, which are achieved by sending data packets having a header on a periodic and/or as-needed basis as header updates. Flexibility to wireless network operators is also provided by embodiments of the present invention, so that the wireless network operators can make necessary trade-offs between transparency, robustness, reliability, and spectral efficiency.

ROHC is an Internet Engineering Task Force (IETF) header compression framework that provides for high efficiency and robustness as required in wireless networks. ROHC has a number of benefits and advantages. ROHC currently supports Real-time Transfer Protocol/Universal Datagram Protocol/Internet Protocol (RTP/UDP/IP) and UDP/IP compression profiles. ROHC also includes planned support for a Transmission Control Protocol/Internet Protocol (TCP/IP) compression profile.

ROHC has very high spectral efficiency. ROHC is transparent, which means that ROHC is able to generate semantically-identical headers. ROHC also exhibits robustness, which is defined as the ability to tolerate errors on the wireless links. ROHC is useable with multi-media applications and provides a single header compression framework for various applications, protocols, and wireless technologies.

ROHC is currently capable of producing a plurality of compressed header types having different sizes. These compressed header types include packet type 0 (UO-1, 1 byte), packet type 1 (UO-1, 2 bytes), packet type 2 (UO-2, 3 bytes plus extension), packet type 5 (IR, approximately 40 bytes and used to send an initial IP/UDP/RTP header), packet type 6 (IR-DYN, approximately 20 bytes), feedback-1 (1 byte), and feedback-2 (at least 2 bytes). In accordance with the principles of the present invention, the zero byte profile includes a new packet type having zero bytes. The zero byte profile uses one or more of the above header packet types in order to support updating strategies in accordance with principles of the present invention. The zero byte profile used in accordance with embodiments of the present invention also imposes a limit on the maximal header size that can be accepted.

The ROHC compression/decompression operation comprises the following: (1) a compressor constructs a compressed header that includes encoded versions of some of the original RTP/UDP/IP fields and also includes a cyclical redundancy check (CRC) that is computed on the full original header; (2) a decompressor uses a current state (i.e., the context) and the encoded fields of the compressed header in order to produce a decompressed header. A context is a state that the compressor uses to compress a header and that the decompressor uses to decompress the header. The context is in essence an uncompressed version of the last header sent by the compressor or received by the decompressor over the wireless link, except for fields in the header that are included as-is in compressed headers or can be inferred from, for example, the size of a link-level frame. The context can also contain additional information describing a data packet stream, such as, for example, typical inter-packet increase in sequence numbers or time stamps.

By recalculating the CRC of the decompressed header and comparing it to the received CRC, the decompressor can verify whether the process of compression/decompression is transparent and has been successful. The size of the compressed header varies depending upon the dynamics of the header compression. ROHC currently provides for header sizes as small as 1, 2, and 3 bytes, which are the sizes used most often by ROHC.

The existing ROHC profiles are designed to work well over wireless links without imposing restrictive requirements or making specific assumptions regarding underlying architectural, design, or implementation properties of the links. However, some systems have properties that can be advantageously exploited with respect to header compression. Embodiments of the present invention exploit the flexibility of ROHC in order to capitalize on such properties by defining a new profile.

The headerless (i.e., zero byte) profile is preferably used when an underlying link layer comprises a synchronous slotted channel (e.g., 20 ms frames), play-out buffers are employed, and timer-based compression/decompression is used. In a preferred embodiment, the zero byte profile can be used to compress traffic in which VoIP traffic is present, sequential or sequential-jump IP Identifier (IPID) assignment is used, and there is no IP fragmentation or UDP check sum.

In the event that some of the above characteristics cannot be satisfied, a filter can be added before the compressor in order to map changing fields into new ones that can be supported by the zero byte profile. For example, if the IP Identifier (IP-ID) field is randomly assigned, the filter can change the randomly-assigned IP-ID values into sequentially-assigned ones before the headers are supplied to the compressor.

In order to send zero byte compressed headers (i.e., headerless data packets) during the bulk of the compressor's operation time, the zero byte profile exploits the characteristics described above. The zero byte profile relies on proper buffering and ordering of data packets (e.g., IP/UDP/RTP packets) and timer-based decompression to regenerate a dynamic part of the header (e.g., RTP Sequence Number (RTP SN), RTP Timestamp (RTP TS), or IP-ID). In order to maintain transparency of the header compression and compressor-decompressor synchronization, embodiments of the present invention from time to time send a data packet having a header, referred to as a header update. The data packet that includes the updated header can include a compressed or an uncompressed header, but is preferably a ROHC compressed header.

One or more strategies can be employed by the compressor in accordance with embodiments of the present invention in order to ensure transparency by sending header-update data packets having either compressed or uncompressed headers. Header updates are preferably performed using ROHC compressed headers. First, header updates can be sent on a periodic basis. A periodic update mechanism is used that is flexible and aware of link and physical layer limitations of the wireless link over which the data packets are sent. Header updates can also be sent when the compressor detects changes in slowly-varying original header fields or in response to feedback received from the decompressor, such as, for example, when a decompression context is out of synchronization. Compressed headers can also be sent just before talk spurts occur.

Figure 1B:
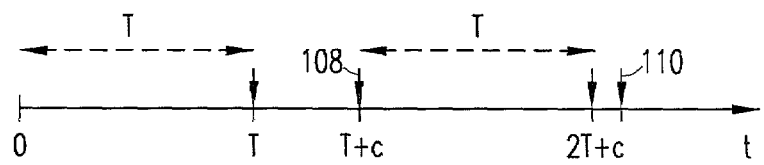
FIG. 1(b) is a diagram that illustrates a second exemplary periodic update scheme in accordance with principles of the present invention.

FIGS. 1(a) and 1(b) are diagrams that illustrate two exemplary periodic update schemes that can be implemented in accordance with the principles of the present invention. FIG. 1(a) illustrates a scheme in which a compressor attempts to send a data packet having a header every T packets or time units. Depending upon the size of the payload and data packet size, the compressor may or may not be able to send a header with a particular packet.

Performing periodic header updates by sending a data packet that has a compressed or an uncompressed header is one of the techniques that can be used in accordance with the principles of the present invention to ensure transparency and robustness of the zero byte profile. It is preferable that the header update use a compressed rather than an uncompressed header. Although use of periodic updates is already defined by ROHC, the zero byte profile used in accordance with principles of the present invention provides additional flexibility to the periodic updating scheme beyond that possible with ROHC. The period, as well as other parameters, of the periodic update mechanism is flexible and negotiable. Wireless network operators have full control in configuring parameters of the periodic update mechanism in ways that meet their transparency and robustness requirements.

Under certain circumstances, radio-bearer limitations may mandate that a compressed or uncompressed header cannot be sent with a particular data packet. For example, the compressor may determine that it cannot send a header with a given packet because the payload size is too great. In such a situation, the flexible header update technique in accordance with embodiments of the present invention does not require a strict time period within which to send the data packet having a header, but rather allows a time interval to achieve the header update.

Referring again to FIG. 1(a), at T, the compressor attempts to send a data packet having a header, as illustrated by arrow 102. The header update preferably uses a ROHC compressed header. The compressor continues to try to send a data packet having a header until a time that is less than T+a, represented by arrow 104, is reached, at which time the compressor is successful in sending a data packet having a header as a header update. Time T+a represents a trial interval, at the end of which, if the compressor is unable to send a data packet having a header as a header update, the compressor quits trying to send a data packet having a header as a header update.

At time 2T, the compressor again begins to attempt to send a data packet having a header as a header update. The header update preferably uses a ROHC compressed header. The compressor successfully sends the header update before 2T+a is reached, as illustrated by arrow 106. At time 2T+a, the trial interval corresponding to time 2T ends. At time 3T (not shown), the compressor again begins to attempt to send a header update.

As an alternative to the mechanism described in FIG. 1(a), at the end of the trial interval (e.g., T+a), the compressor can use blank-and-burst (i.e., speech blanking) to send the header update instead of all or part of the payload associated with a given packet, if the compressor is not otherwise able to perform the header update. Blank-and-burst is not a preferred method of performing the header update, because it inherently requires a loss of data packet payload and therefore likely requires that voice quality over the wireless link be impaired during the time that the blank-and-burst occurs.

FIG. 1(b) illustrates an alternative header update scheme in accordance with principles of the present invention. In FIG. 1(b), the compressor begins to attempt to send a data packet having a header at T packets or time units. The header update preferably uses a ROHC compressed header. The compressor will keep attempting to perform a header update until it is successful, as illustrated by arrow 108 at T+c. After the header update is successfully performed at T+c, a new starting point for the period T is begun, such that, at time 2T+c, the compressor begins again to attempt to perform a header update. At arrow 110, a second data packet having a header, preferably a ROHC compressed header, is successfully sent.

During a talk spurt, data packets of maximal payload size typically persist over a significant duration of time. Therefore, the radio bearer is constrained to carrying maximal payload and may not be capable of carrying data packets having headers during the time that the talk spurt occurs. A mechanism that addresses talk spurts and which, in a preferred embodiment, may be activated or deactivated by a wireless network operator, predicts or detects a beginning of a talk spurt and sends a data packet having a header, preferably a ROHC compressed header, just before the talk spurt begins.

When prediction of the talk spurt is implemented, the compressor determines the properties of an incoming sequence of data packets that have already been transmitted by the compressor. Using at least one property of these previously transmitted data packets, the compressor predicts the properties of incoming packets. When the predicted properties of the incoming data packets indicate that they comprise a talk spurt, a data packet having a header is transmitted prior to the first data packet of the predicted talk spurt.

When detection is used by the compressor, the compressor delays and/or buffers, but does not transmit, a given data packet until a subsequent sequence of data packets have been received and examined in order to determine whether a talk spurt is occurring. If the subsequent sequence of data packet indicates a talk spurt, a data packet having a header is transmitted prior to the first data packet comprising the talk spurt. In a preferred embodiment, the detection mechanism is used, since the zero byte profile preferably employs a playout buffer in order to avoid compression problems due to downlink jitter. In this embodiment, an uplink buffer is also needed.

A data packet having a header can also be sent by the compressor in order to indicate changes in slowly-varying fields of the header. This option can preferably be activated/deactivated by a network operator. Negative feedback can also be sent from the decompressor to the compressor to indicate that the decompression context is invalid. In response to such feedback, the compressor can send header updates. This option can also, in a preferred embodiment, be activated or deactivated by wireless network operators.

Any combination of the various header updating techniques described herein can be employed in accordance with the principles of the present invention. For example, a single header can be sent that serves as a feedback response as well as a periodic update.

Figure 2:
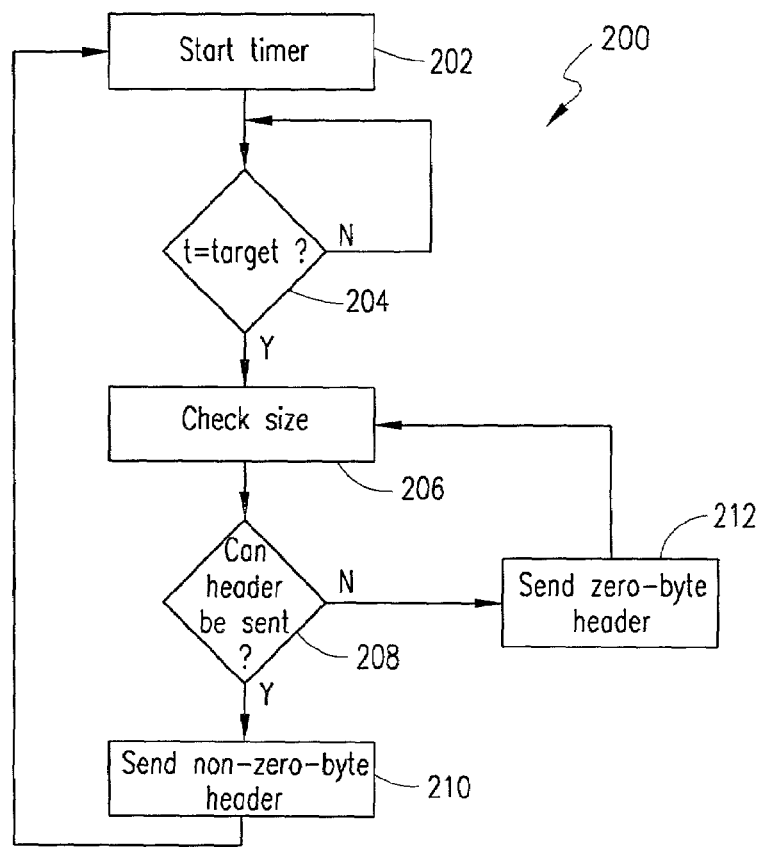
FIG. 2 is a flow diagram that illustrates a flow for performing periodic updates in accordance with principles of the present invention.

FIG. 2 is a flow diagram that illustrates a flow 200 that can be used by the compressor when the compressor sends a periodic update. The flow 200 begins at step 202. At step 202, a timer (or, alternatively, a packet counter) is set to zero and is started running. At step 204, a determination is made whether a target value (e.g., a specified time or number of packets) has been reached. If it is determined at step 204 that the target has been reached, execution proceeds to step 206. If, at step 204, it is not determined that the target has been reached, execution moves to step 204.

At step 206, a payload size of a current packet is checked by the compressor. The payload size is checked so that the compressor can in later steps determine whether there is room for inclusion of a header in the data packet so that a header update can be performed. From step 206, execution proceeds to step 208. At step 208, a determination is made whether a header can be sent with the current data packet. In other words, the compressor determines whether there is enough room in the frame to include a header along with the payload.

If it is determined at step 208 that a header can be sent with the current data packet because there is room in the frame for a header to be included, execution proceeds to step

210. At step 210, a non-zero-byte header update is sent with the current data packet as a header update. From step 210, execution moves to step 202. If it is not determined at step 208 that a header can be sent with the current data packet, execution proceeds to step 212. At step 212, a zero byte header is sent with the current data packet. In other words, at step 212, a headerless data packet is sent by the compressor. From step 212, execution moves to step 206. Although in FIG. 2, each subsequent packet is checked in order to determine whether a header update can be performed, more than one packet can be transmitted with a zero-byte header before a subsequent packet is checked.

FIG. 2 illustrates that the compressor periodically checks the current data packet payload size and, if possible, sends a data packet having a header as a header update. The header update preferably uses a ROHC compressed header. If the current data packet does not permit a data packet having a header to be sent as a header update, the compressor continues to check each subsequent data packet's size until it finds a data packet that permits a header update to be sent. In the interim while the compressor is checking for a data packet that will permit a header update to be sent, the compressor continues to send headerless data packets.

Exemplary embodiments of the present invention adapted to be used on cdma2000 radio bearers will now be described. However, it should be understood by those having ordinary skill in the art that the principles of the present invention are not limited to cdma2000, but rather can be implemented on many different wireless radio bearers, such as, for example, GSM/GPRS (with or without EDGE), WCDMA, and TDMA (IS-136). Moreover, even though two nodes are represented herein as an exemplary mobile station and packet data service node, it will be understood by those skilled in the art that various nodes can operate according to principles of the present invention, such as, for example, base stations, mobile switching centers, and the like, and that the nodes can but need not be located at termination points of fixed networks.

The Selectable Mode Vocoder (SMV) used in cdma2000 has a payload that is targeted towards a fundamental channel having a maximum rate of 9.6 kbps. Therefore, in the examples below, the fundamental channel having a maximum rate of 9.6 kbps is used for carrying VoIP payload plus headers. A comparison of different available SMV payload sizes against various fundamental channel multiplexing formats reveals that the fundamental channel can carry a compressed header whenever less-than-full-rate SMV voice frames are produced.

In cdma2000, compressed headers cannot be sent for every possible VoIP data packet because sometimes the payload size relative to the frame size does not leave enough room to carry compressed headers. For example, when VoIP data packet payload is 170 bits, a compressed header cannot be transmitted and only VoIP payload can be sent in a 20 ms frame. In such a situation, blank-and-burst (i.e., speech blanking) can be used to send a compressed header, without any payload being sent in the data packet. Dim-and-burst could also be used; however, dim-and-burst is not as desirable as blank-and-burst because dim-and-burst requires a signal from the decompressor to the compressor that explicitly requests a lower frame rate.

Even in cases in which there is enough room in the 9.6 kbps fundamental channel to carry a compressed header, headers should not be sent unless necessary, in order to maximize the spectral efficiency of the wireless link. Therefore, in accordance with principles of the present invention, a mechanism is defined for sending data packets with headers as header updates. The header update techniques described herein can be used either singly or in combination with another.

Headers decompressed at the decompressor must be identical to the original headers within a reasonable probability. In other words, the IETF transparency and robustness requirements must be attained. The update mechanisms described herein provide the necessary tools to achieve the goals of transparency and robustness. Full flexibility is given to cdma2000 operators so that they can decide how to balance transparency and robustness against spectral efficiency.

Table 1 illustrates the structure of the 9.6 kbps fundamental channel in cdma2000. At 9.6 kbps, the fundamental-channel frame includes primary traffic, signaling traffic, and secondary traffic. Within the 9.6 kbps fundamental-channel frame, primary traffic can carry voice payload of 171, 80, 40 or 16 bits. Signaling traffic can carry 88, 128, 152, or 168 bits. Secondary traffic can carry 88, 128, 152, or 168 bits. MM designates mixed mode, which is a qualifier of whether concurrent traffic types are sent in the frame. Zero means that only one type (i.e., primary) and one means that two different traffic types (i.e., either primary and secondary or primary and signaling). TT designates the traffic type. If MM is one, TT distinguishes the second traffic type as being either secondary or signaling traffic. TM designates the traffic mode. When two traffic types are sent in the frame, TM qualifies/identifies the bit rate of each traffic type in the frame.

TABLE 1

Structure of cdma2000 9.6 kbps FCH

| Transmit Rate (kbps) | MM | TT | TM | Primary Traffic (bits) | Signaling Traffic (bits) | Secondary Traffic (bits) |
|---|---|---|---|---|---|---|
| 9.6 | 0 | — | — | 171 | 0 | 0 |
|  | 1 | 0 | 00 | 80 | 88 | 0 |
|  | 1 | 0 | 01 | 40 | 128 | 0 |
|  | 1 | 0 | 10 | 16 | 152 | 0 |
|  | 1 | 0 | 11 | 0 | 168 | 0 |
|  | 1 | 1 | 00 | 80 | 0 | 88 |
|  | 1 | 1 | 01 | 40 | 0 | 128 |
|  | 1 | 1 | 10 | 16 | 0 | 152 |
|  | 1 | 1 | 11 | 0 | 0 | 168 |
| 4.8 | — | — | — | 80 | 0 | 0 |
| 2.4 | — | — | — | 40 | 0 | 0 |
| 1.2 | — | — | — | 16 | 0 | 0 |

If a data packet having a compressed header is to be sent as primary traffic, the compressed header is preferably added to the voice payload and the total number of bits in the primary traffic fundamental-channel frame is increased to the next level. A unique-leading data sequence can be defined within the primary traffic frame in order to indicate whether the frame is or is not carrying voice payload plus a header.

For example, if 40 bits of VoIP payload is being sent and a header needs to be sent in order to perform a header update, then the 80-bit primary traffic frame could be used and an 8-bit sequence of 11111111 used to indicate the presence of a header, two bits (e.g., 01) could be used to indicate that the voice payload size is 40 bits and not 16 bits, the next 40 bits used as voice payload, and all or some of the remaining 30 bits used to hold the compressed header information.

In the alternative, the VoIP data packet payload can be sent as primary traffic and the compressed header sent as signaling traffic. If the compressed header is sent as signaling traffic, synchronization is required to ensure that the VoIP payload and its compressed header are sent in the same 20 ms frame. Otherwise, the decompressor does not know how to associate the proper header with the proper payload. If this alternative is employed, the delay of primary traffic and signaling traffic in reaching the decompressor is assumed to be within an acceptable limit that enables resolution of header-payload association without uncertainty.

As another alternative, the compressed header can be sent as secondary traffic and the VoIP payload sent as primary traffic. Similar issues to those when the compressed header is sent as signaling traffic are present when the compressed header is sent as secondary traffic.

From a spectral efficiency perspective, sending the compressed header as primary traffic is preferable to sending the compressed header as signaling or secondary traffic, because sending the compressed header as secondary or signaling traffic only permits transmission of a data packet having payload and a header using full-rate channel frames (i.e., 9.6 kbps). This is because when 4.8 kbps, 2.4 kbps, or 1.2 kbps rates are used, signaling and secondary traffic are not available, as shown in Table 1. In contrast, when the compressed header is sent as primary traffic, 9.6 kbps, 4.8 kbps, 2.4 kbps or 1.2 kbps rates can be used.

In addition, when the compressed header is sent as primary traffic, the payload and header, including any unique leading sequence and payload size data, can be combined and formatted at the compressor without the physical or MAC layers being aware of the formatting or combination thereof. In contrast, when a compressed header is sent as signaling traffic or secondary traffic, a mechanism that guarantees transmission of the payload and its associated header during the same 20 ms frame is necessary. A mechanism to guarantee this association during the same 20 ms frame introduces additional complexities not present when the compressed header is sent as primary traffic.

If the compressor is closely tied to the physical layer and therefore does not use compressed headers, sending the compressed header as primary traffic typically requires a filter to reverse modifications made to the voice payload format, such as, for example, modifications that would permit the compressor to be aware of changes introduced by header compression.

In cdma2000, all data traffic, including VoIP data packets, uses the point to point protocol (PPP) as the link layer. Because there is a strong need in cdma2000 to support VoIP and header compression on currently-existing radio bearers, rather than devising or optimizing new radio bearers for purposes of VoIP, in accordance with principles of the present invention, ROHC can be extended to support the needs of VoIP and related services in cdma2000.

Figure 3:
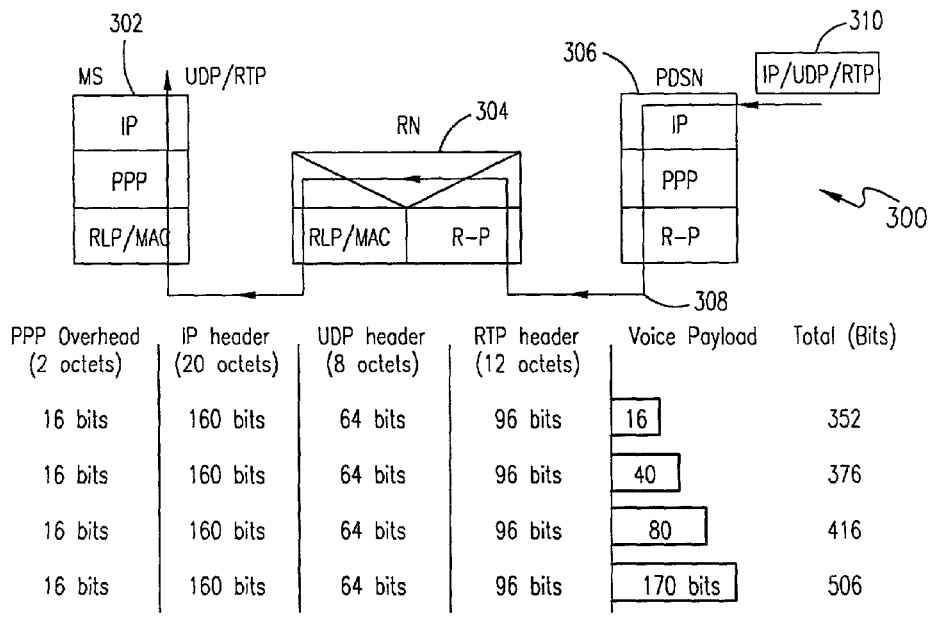
FIG. 3, previously described in part, is a block diagram that illustrates transmission of Voice over IP data packets in cdma2000 in accordance with principles of the present invention.

Embodiments of the present invention permit support of header compression on existing cdma2000 radio bearers, such as, for example, the bearer illustrated in FIG. 3, that have not been optimized for VoIP. Limitations imposed by these existing cdma2000 radio bearers can influence operation of the above-described techniques for sending data packets having headers as header updates; therefore, limitations of the existing cdma2000 radio bearers are taken into account.

One of the limitations imposed by many existing cdma2000 radio bearers is the capacity of the radio bearers to carry a compressed or uncompressed header. In order to deal with these limitations, embodiments of the present invention include a mechanism that can dynamically determine radio-bearer limitations or constraints and adapt the header-updating techniques to overcome these radio-bearer limitations. The ability of embodiments of the present invention to dynamically learn of the radio-bearer constraints is preferably performed on a data-packet-by-data packet basis.

Radio-bearer limitations can be communicated to the compressor via explicit signaling from another entity, such as, for example, a MAC. Signals from the MAC to the compressor indicate to the compressor whether the radio bearer is capable of carrying a compressed or an uncompressed header, and, if so, a maximally-sized header that can be carried by the radio bearer. However, if the compressor and the radio bearer are not located within the same node, explicit signaling can introduce additional complications.

In a preferred embodiment, the compressor includes logic that permits a determination to be made of the size of the payload of the data packet and a comparison to be made of this payload size against a locally-defined mapping, which can be in the form of, for example, a table. The mapping indicates whether a compressed or uncompressed header can be sent on the radio bearer, and, if so, the maximal size of the header that can be sent. The mapping logic is implemented in preferred embodiments of the present invention because it is localized in the compressor and does not require signaling or other interaction between the compressor and other entities. Rather, the mapping logic achieves the goal of providing header updates by examining the payload size and consulting a locally defined mapping.

Referring again to FIG. 3, also shown is the overhead associated with PPP, IP, UDP, RTP, and voice payload. The overhead of full IP/UDP/RTP and PPP headers is very substantial, in that it equals 42 octets (i.e., 336 bits). Given a 20 ms frame and a 9.6 kbps fundamental channel, it is impossible to fit the 212-octet overhead into a single frame, since a maximum of 192 bits can be transmitted in a single frame. Thus, there is a need to avoid the PPP overhead in addition to the need for ROHC IP/UDP/RTP header compression.

Figure 4:
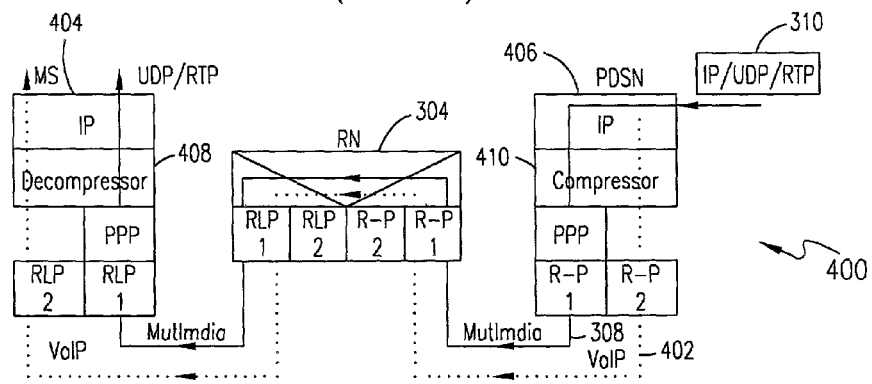
FIG. 4 is a block diagram that illustrates a system in accordance with principles of the present invention in which a PPP-free connection between a Packet Data Service Node and an mobile station can be attained.

FIG. 4 is a block diagram that illustrates a system in accordance with principles of the present invention in which a so-called PPP-free connection between a PDSN and an MS can be attained. In addition to the RN 304, the IP/UDP/RTP data packets 310, and the arrow 308 illustrated in FIG. 3, FIG. 4 also shows, as part of a system 400, an MS 404 and a PDSN 406. The MS 404 includes a decompressor 408, while the PDSN 406 includes a compressor 410. In addition, a dashed arrow 402 illustrates a PPP-free connection between the PDSN 406 and the MS 404. Although not explicitly shown, it will be understood by those skilled in the art that a transmission path from the MS 404 to the PDSN 406 operates in a similar fashion to that described herein.

The PPP-free connection is described in GEHCO contributions to IETF and permits establishment of a second R-P session that is connected to a null-RLP (e.g., RLP 2) in the RN 304. The system 400 can be adopted for applications in which spectral efficiency is especially important and in which the two-octet (i.e., 16 bit) PPP overhead introduces significant spectral efficiency losses, such as, for example, in VoIP.

In a preferred embodiment of the present invention, the PPP-free connection between the PDSN 406 and the MS 404 is used for VoIP. Other packet data applications, such as, for example, IP multimedia (IPMM) typically use a regular connection that includes PPP, as illustrated by the arrow 308. This is because in IPMM, spectral efficiency is only marginally affected by the PPP overhead, since IPMM applications use much larger payload sizes than VoIP.

Figure 5:
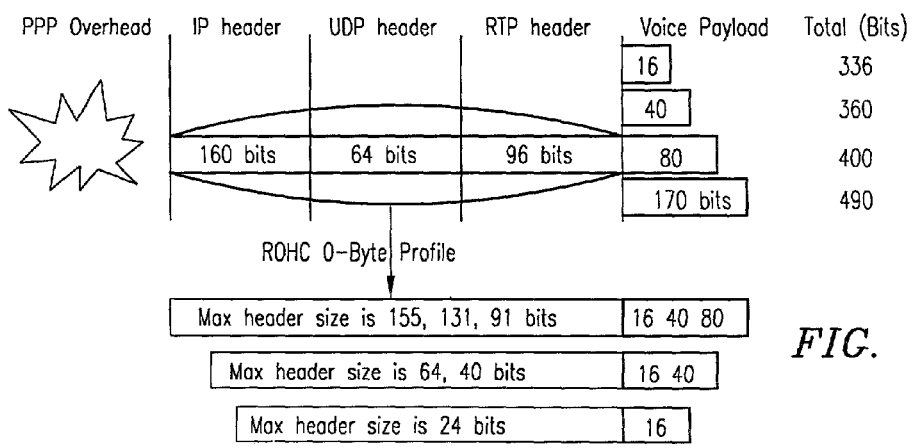
FIG. 5 is a diagram that illustrates how maximal sizes of compressed headers can be derived assuming Selectable Mode Vocoder payload sizes and a 9.6 kbps fundamental channel radio bearer in cdma2000 in accordance with principles of the present invention.

FIG. 5 is a diagram that illustrates how maximal sizes of compressed headers can be derived assuming SMV payload sizes and a 9.6 kbps fundamental channel radio bearer in cdma2000 in accordance with principles of the present invention. FIG. 5 assumes that a PPP-free connection is used, as indicated by the starburst in the column pertaining to PPP overhead. It is also assumed that the compressed header is sent as primary traffic and that the zero byte profile in accordance with principles of the present invention is used. As shown in FIG. 5, a 171 bit frame can accommodate a maximal header size of 155, 131, or 91 bits for voice payload sizes of 16, 40, and 80 bits, respectively. In a similar fashion, if an 80 bit frame is used, a maximal header size of 64 or 40 bits can be accommodated for voice payloads of 16 or 40 bits, respectively. Further, if a 40 bit frame size is used, a maximal header size of 24 bits can be accommodated when a 16 bit voice payload is used. Thus, it can be seen that a 40, 80, or 171 bit frame can be used to send compressed headers in cdma2000 in accordance with the principles of the present invention.

A mapping (e.g., a table) can be used to implement additional logic required by, for example, the compressor 410, to determine limitations of the 9.6 kbps fundamental channel radio bearer shown in FIG. 5. The compressor 410 examines the payload size, looks at an appropriate table row, and determines if the compressor 410 can send a header along with the current data packet, and if so, the preferred size of the header to be included in the current data packet. Table 2 is an exemplary table used by, for example, the compressor 410.

TABLE 2

Local Table (Mapping) used at the Compressor

| Payload Size | Can Send Header? | Preferred Max Header Size | 2$^{nd}$ Preferred Max Header Size | 3$^{rd}$ Preferred Max Header Size |
|---|---|---|---|---|
| 171 | NO | — | — | — |
| 80 | YES | 91 bits | — | — |
| 40 | YES | 40 bits | 131 bits | — |
| 16 | YES | 24 bits | 64 bits | 155 bits |

Table 2 shows that, for a payload size of 171 bits, a header cannot be sent. For a payload size of 80 bits, a header can be sent and the preferred maximal header size is 91 bits. For a payload size of 40 bits, a header can be sent and the preferred maximal header size is 40 bits, a second preferred maximal header size being 131 bits. For a payload size of 16 bits, a header can be sent and the preferred and maximal header size is 24 bits, the second preferred maximal header size is 64 bits, and the third preferred maximal header size is 155 bits.

Header updates as described herein can be easily implemented for the cdma2000 SMV compressor, by having the compressor and delay and/or buffer a first packet until one or more subsequent data packets arrives and is examined. If the size of the subsequent packet's payload is 171 bits, a header is created for the first packet and transmitted along with the first data packet.

Full flexibility is provided to cdma2000 operators in order to achieve their spectral efficiency targets through the ability to activate or deactivate the periodic update mechanism and to set or negotiate the flexible period of the periodic update mechanism. In addition, spectral efficiency targets can be achieved through the use of activation or deactivation of updating of slowly-varying header fields and of sending of updates in response to feedback. Any of the above-mentioned mechanisms can be used in various combinations according to wireless network operator's objectives.

Although embodiment(s) of the present invention have been illustrated in the accompanying Drawings and described in the foregoing Detailed Description, it will be understood that the present invention is not limited to the embodiment(s) disclosed, but is capable of numerous rearrangements, modifications, and substitutions without department from the invention defined by the following claims.

What is claimed is:

1. A method of transmitting data packets over a synchronous wireless link comprising the steps of:
   starting, at a first node, a timer;
   determining, at the first node, whether the timer has reached a target value;
   in response to the step of determining that the timer is below the target value, sending from the first node to a second node a headerless data packet on the synchronous wireless link, wherein a sequential timer-based value is associated with the headerless data packet;
   in response to the step of determining that the timer has reached the target value, checking a packet payload size and determining whether the packet payload size permits transmission of the header with the data packet to the second node;
   in response to the step of checking that the packet payload size permits transmission of a header with the packet, transmitting the packet data with the header to the second node;
   in response to the step of checking that the packet payload size is above a maximal payload size, transmitting the headerless data packet to the second node; and
   repeating, at the first node, the steps of:
      checking the packet payload size;
      determining whether the packet payload size permits transmission of the header with the packet to the second node;
      transmitting the headerless data packet to the second node; and
      resetting the timer until the step of checking that the packet payload size permits transmission of the header with the data packet.

2. The method of claim 1, further comprising assessing radio-bearer limitations of the synchronous wireless link.

3. The method of claim 2, wherein the step of assessing further comprises determining whether a size of the payload will permit a data packet having a header to be sent on the synchronous wireless link.

4. The method of claim 3, wherein the step of checking whether the packet payload size permits transmission of a header with the packet further comprises determining the maximal payload size that can be sent on the synchronous wireless link.

5. The method of claim 3, wherein the period of sending of the data packet having the header varies in response to the step of determining whether the size of the payload will permit a data packet having a header to be sent on the synchronous wireless link.

6. The method of claim 2, wherein the step of assessing is performed on a data-packet-by-data-packet basis.

7. The method of claim 1, wherein the step of sending the data packet having the header is performed due to a talk spurt.

8. The method of claim 7, wherein the data packet having the header comprises a compressed header.

9. The method of claim 1, wherein the data packet having the header comprises a compressed header.

10. The method of claim 1, wherein the method operates according to at least one of GSM/GPRS, WCDMA, cdma2000, and TDMA (IS-136).

11. The method of claim 7, further comprising:
analyzing properties of a plurality of previously-sent data packets;
based on the analysis, predicting that a talk spurt is about to occur; and
wherein the step sending the data packet having the header on the synchronous wireless link is performed in response to the prediction.

12. The method of claim 7, further comprising: buffering a plurality of data packets; examining the plurality of data packets to determine whether a talk spurt is occurring; and wherein the step of sending the data packet having the header on the synchronous wireless link is performed in response to a determination that a talk spurt is occurring and prior to sending of a first data packet including the talk spurt.

13. The method of claim 1, wherein the step of sending the data packet having the header is performed periodically.

14. The method of claim 13, wherein the data packet having the header comprises a compressed header.

15. The method of claim 13, wherein the step of sending the data packet having the header comprises:
determining a maximal payload size that can be sent on the synchronous wireless link;
in response to a determination that a payload size of a packet data is above the determined maximal payload size, sending at least one headerless data packet; and
in response to a determination that a data packet having a header can be sent, sending a data packet having a header that is below the determined maximal payload size.

16. The method of claim 1, further comprising:
receiving, at the second node, the headerless data packet from the synchronous wireless link;
decompressing, at the second node, based at least in part on the sequential timer-based value associated with the received headerless data packet, the header of the received headerless data packet; and
wherein the step of decompressing comprises timer-based decompression of at least one dynamic part of the header of the received headerless data packet.

17. The method of claim 16, wherein the at least one dynamic part comprises at least one of a Real-time Transport Protocol Sequence Number, a Real-time Transport Protocol Timestamp, and an IP-Identifier.

18. The method of claim 1, wherein the step of sending the data packet having the header is performed in response to a determination that a value of a slowly-varying field in a removed header has changed from an earlier value thereof.

19. The method of claim 18, wherein the data packet having the header comprises a compressed header.

20. The method of claim 1 wherein the step of sending the data packet having the header is performed in response to feedback indicating that the sequential timer-based value associated with the received headerless data packet is different than a sequential timer-based value expected.

21. The method of claim 20, wherein the data packet having the header comprises a compressed header.

22. The method of claim 1, wherein the sequential timer-based value comprises at least one of a Real-time Transport Protocol Sequence Number, a Real-time Transport Protocol Timestamp, and an Internet protocol identifier.

23. The method of claim 1, further comprising removing a header from a data packet comprising a payload and the header, thereby creating a headerless data packet.

24. The method of claim 1, wherein the step of decompressing comprises timer-based decompression.

25. The method of claim 1, wherein the header is sent as primary traffic.

26. The method of claim 1, wherein the header is sent as signaling traffic.

27. The method of claim 1, wherein the header is sent as secondary traffic.

28. A node for transmitting data packets over an asynchronous wireless link, the node comprising:
a compressor adapted to:
determining a target value;
starting a timer;
determining whether the timer has reached the target value;
checking a packet payload size and determining whether the packet payload size permits transmission of the header with the data packet to a second node in response to the step of determining that the timer has reached the target value;
a transmitter adapted to:
send a headerless data packet on the synchronous wireless link in response to the determination at the compressor that the timer is below the target value, wherein a sequential timer-based value is associated with the headerless data packet;
transmit the packet data with the header to the second node in response to the step of checking, at the compressor, that the packet payload size permits transmission of a header with the packet;
transmit the headerless data packet to the second node in response to the step of checking, at the compressor, that the packet payload size is above a maximal payload size;
wherein the compressor is adapted to repeat the execution of the steps of checking the packet payload size, determining whether the packet payload size permits transmission of the header with the packet to the second node, resetting the timer and the transmitter is adapted to repeat the execution of the step of transmitting the headerless data packet to the second node until the step of checking that the packet payload size permits transmission of the header with the data packet.

29. The node of claim 28, wherein the node is adapted to determine a maximal size payload header that can be sent by the node on the synchronous wireless link.

30. The node of claim 28, wherein the node operates according to at least one of GSM/GPRS, WCDMA, cdma2000, and TDMA (IS-136).

31. The node of claim 28, wherein the first data packet having the header is sent in response to feedback indicating that the sequential timer-based value is different than a sequential timer-based value expected.

32. The node of claim 28, wherein the second data packet having a header comprises a compressed header.

33. The node of claim 28, further comprising:
a compressor adapted to:
remove a header from a data packet comprising a payload and the header, thereby creating the headerless data packet a receiver adapted to:
  receive the headerless data packet via the synchronous wireless link; and
a decompressor adapted to:
  decompress, based at least in part on the sequential time-based value associated with the headerless data packet, the header of the headerless data packet.

34. The node of claim 28, wherein the sequential timer-based value comprises at least one of a Real-time Transport Protocol Timestamp, a Real-time Transport Protocol Sequence Number, and an Internet protocol identifier.

\* \* \* \* \*